United States Patent
Cheng et al.

(10) Patent No.: US 7,094,097 B2
(45) Date of Patent: Aug. 22, 2006

(54) ELECTRICAL CARD CONNECTOR

(75) Inventors: Yung Chang Cheng, Tu-Chen (TW); Chien Jen Ting, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/168,596

(22) Filed: Jun. 27, 2005

(65) Prior Publication Data

US 2006/0134976 A1   Jun. 22, 2006

(30) Foreign Application Priority Data

Dec. 17, 2004   (TW) ............................... 93220374 U

(51) Int. Cl.
   *H01R 13/60*   (2006.01)
(52) U.S. Cl. .................... 439/541.5; 439/607
(58) Field of Classification Search ............ 439/541.5, 439/607; 361/737, 684
   See application file for complete search history.

(56) References Cited

U.S. PATENT DOCUMENTS

| | | | | |
|---|---|---|---|---|
| 5,643,001 A | * | 7/1997 | Kaufman et al. ........... | 439/159 |
| 6,120,322 A | * | 9/2000 | Ho et al. .................. | 439/541.5 |
| 6,540,552 B1 | | 4/2003 | Kuo | |
| 6,551,131 B1 | | 4/2003 | Kuo | |
| 6,551,132 B1 | * | 4/2003 | Kuo ......................... | 439/541.5 |
| 6,634,903 B1 | * | 10/2003 | Gunreben et al. .......... | 439/459 |
| 2003/0114043 A1 | * | 6/2003 | Kuo ......................... | 439/541.5 |

* cited by examiner

*Primary Examiner*—James R. Harvey
(74) *Attorney, Agent, or Firm*—Wei Te Chung

(57) ABSTRACT

An electrical card connector (1) stacking on a bracket (2) for receiving a hard disk drive comprises an insulating body (3) having a transverse wall (31) far from a front edge (22) of the bracket (2) and relatively adjacent to a rear edge (23) of the bracket (2), a shielding shell (7) covering on the insulating body (3), and a plurality of terminals (5) retained in the insulating body (3). Each terminal (5) has a securing portion secured in the transverse wall (31), an engaging portion (50) extending ahead from the transverse wall (31) for electrically connecting with the electronic card, and an extended portion (51) extending backwardly from the transverse wall (31) and towards and further beyond the rear edge (23) of the bracket (2).

16 Claims, 4 Drawing Sheets

ELECTRICAL CARD CONNECTOR

BACKGROUND OF THE INVENTION

1. Field of the Invention

The present invention generally relates to an electrical card connector, and in particular to an electrical card connector having extended terminals.

2. Description of Related Art

With the trend of reducing the size of a computer device, demand has arisen for increasing its data storage capacity at low cost. Generally, electrical cards, such as memory cards, are functional as data storage devices which are electrically connected to the computer device. The electrical cards are portable instruments that are readily inserted and extracted from electrical card connectors of the computer device. Early in the development of a Notebook Personal Computer (Notebook-PC), an electrical card connector and a hard disk drive (HDD) bracket are individually mounted on a printed circuit board (PCB) of the Notebook-PC. This not only increases the number of components in the Notebook-PC, but also requires a great amount of space for accommodating the individual electrical card connector and HDD bracket.

Subsequently, more electrical card connectors are arranged in "dual port" or stacked configurations. Examples of this electrical connector assembly are disclosed in U.S. Pat. Nos. 6,551,131 and 6,540,552. This electrical connector assembly commonly depends on a flexible printed circuit (FPC) connecting two electrical connectors to a PCB. However, the FPC is much expensive so that the manufacturing cost of the way is high.

SUMMARY OF THE INVENTION

Accordingly, an objection of the present invention is to provide an electrical card connector stacking on a hard disk drive (HDD) bracket for reducing footprint of a printed circuit board and further reducing the manufacturing cost.

In order to achieve the objections set forth, an electrical card connector stacking on a bracket for receiving a hard disk drive in accordance with the present invention comprises an insulating body having a transverse wall far from a front edge of the bracket and relatively adjacent to a rear edge of the bracket, and a shielding shell covering on the insulating body, the shielding shell and the insulating body combining to define a receiving room for receiving an electronic card, the receiving room providing an opening close to the front edge of the bracket. The electrical card connector further comprises a plurality of terminals retained in the insulating body and each terminal has a securing portion secured in the transverse wall of the insulating body, an engaging portion extending ahead from the transverse wall and into the receiving room for electrically connecting with the electronic card, and an extended portion extending backwardly from the transverse wall and towards and further beyond the rear edge of the bracket. Especially, the transverse wall of the insulating body keeps a distance off the rear edge of the bracket.

Other objects, advantages and novel features of the present invention will become more apparent from the following detailed description of the present embodiment when taken in conjunction with the accompanying drawings.

DETAILED DESCRIPTION OF THE INVENTION

Figure 1:
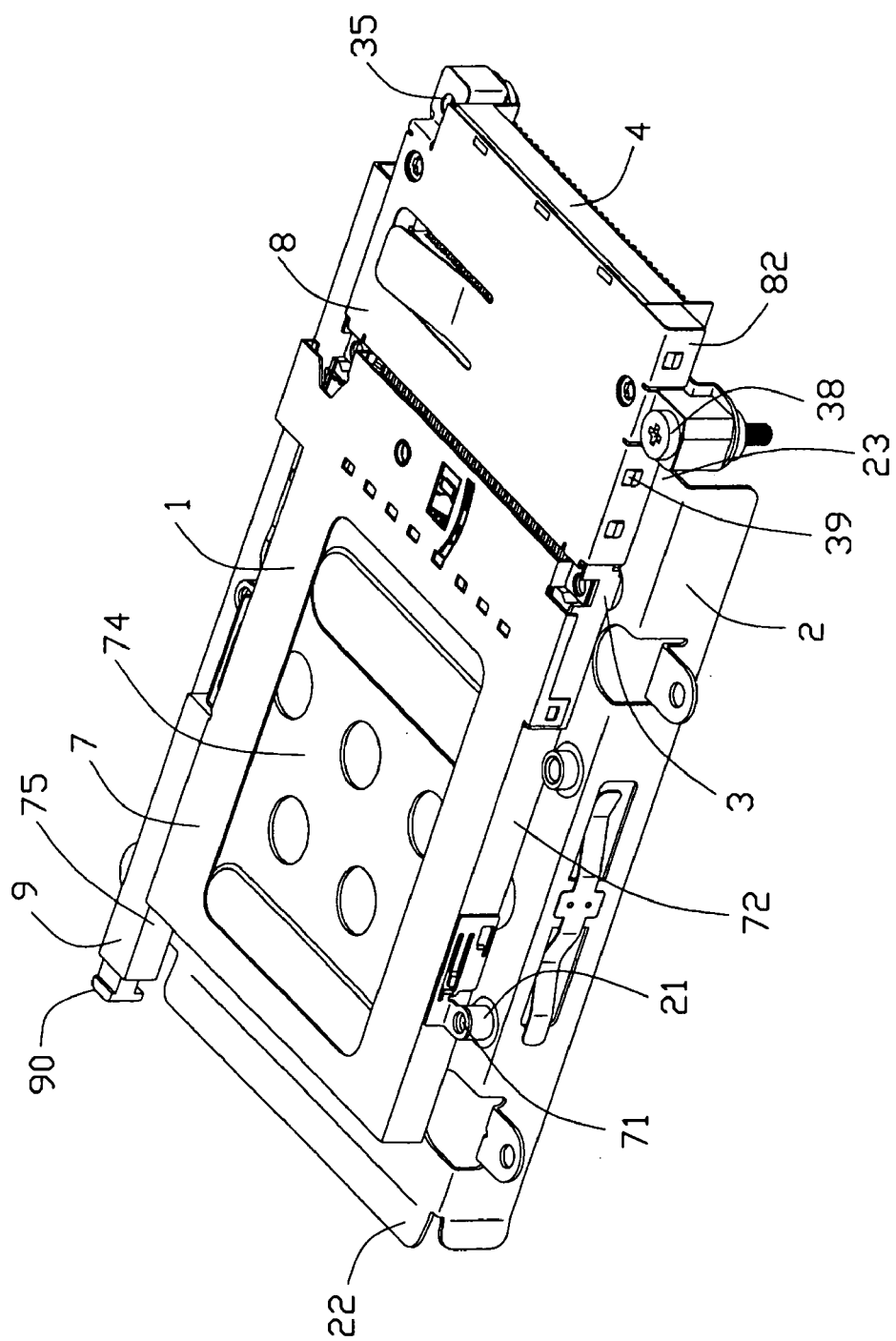
FIG. 1 is a perspective assembled view of an electrical card connector according to the present invention.
Figure 2:
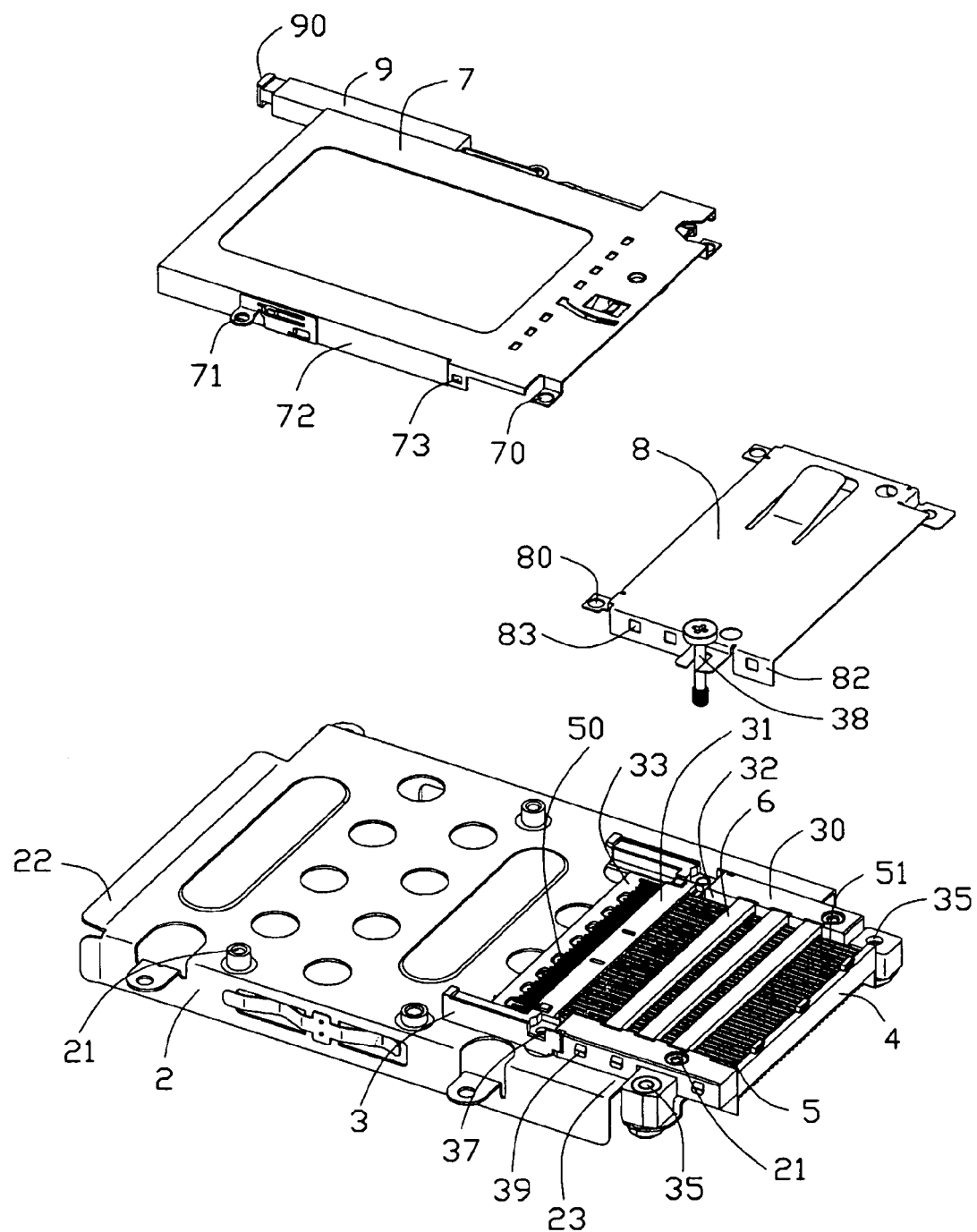
FIG. 2 is a perspective exploded view of the connector.

Referring to the drawings and in particular to FIGS. 1 and 2, an electrical card connector 1 stacking on a bracket 2 for receiving a hard disk drive (HDD) (not shown) in accordance with the present invention comprises an insulating body 3, a locator 4, a plurality of terminals 5 received in both the insulating body 3 and the locator 4, a spacer 6 adapted for securing the terminals 5, a shielding shell 7 and a shielding blade 8 covering on the terminals 5, and a card release mechanism 9 assembled on the shielding shell 7. The shielding shell 7 and the insulating body 3 combine to define a receiving room 74 for receiving an electronic card (not shown). Further, an opening 75 of the receiving room 74 for the electronic card being inserted is close to a front edge 22 of the bracket 2.

Figure 3:
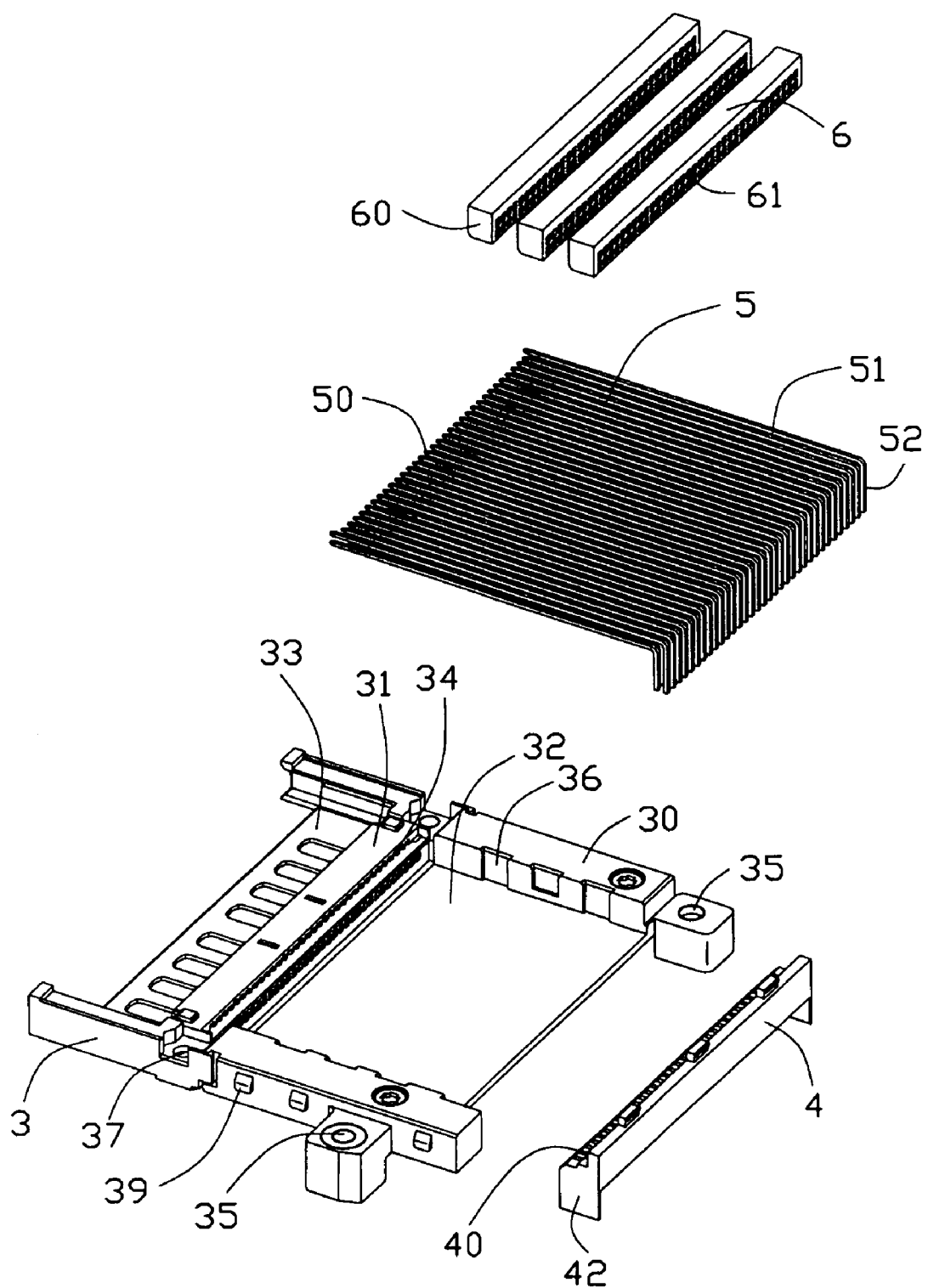
FIG. 3 is a perspective exploded view of a part of the connector.

Combining FIG. 2 with FIG. 3, the insulating body 3 has two parallel guiding arms 30 connected by a transverse wall 31 defining a plurality of terminal receiving passageways 34 in two rows. A terminal receiving section is defined between the guiding arms 30 and divided into a front receiving section 33 and a rear receiving section 32 by the transverse wall 31. The transverse wall 31 is disposed far from the front edge 22 of the bracket 2 and relatively adjacent to a rear edge 23 of the bracket 2, especially the transverse wall 31 keeps a distance off the rear edge 23 of the bracket 2. The terminals 5 are arranged in an upper row and a lower row and each terminal 5 has a securing portion secured in the terminal receiving passageway 34, an engaging portion 50 extending ahead from the transverse wall 31 and into the receiving room 74 for electrically engaging with the electronic card, and an extended portion 51 extending backwardly from the transverse wall 31 and towards and further beyond the rear edge 23 of the bracket 2 under the insulating body 3. The engaging portions 50 are received in the front receiving section 33 and the extended portions 51 are received in the rear receiving section 32. For the extended portion 51 is much longer than the engaging portion 50, the rear receiving section 32 is much larger than the front receiving section 33. Furthermore, the extended portion 51 of the terminal 5 is bending downwardly to form a vertical portion 52 for being soldered on a printed circuit board (PCB) (not shown). In addition, each guiding arm 30 defines a first mounting hole 35 for a bolt 38 (as shown in FIG. 1) being inserted therein to secure both the electrical card connector 1 and the HDD bracket 2 onto the PCB.

Figure 4:
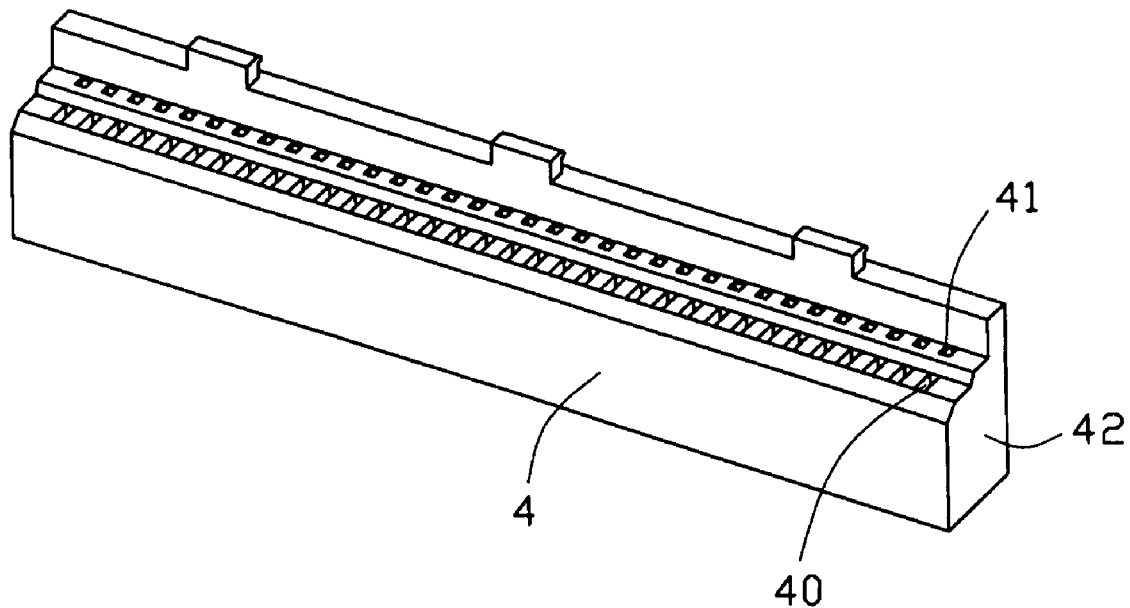
FIG. 4 is a perspective exploded view of a locator of the connector seen from another view.

The locator 4 is disposed at the back of the rear receiving section 32 of the insulating body 3 and has a pair of end walls 42 abutting against inner surfaces of the guiding arms 30. As shown in FIG. 4, the locator 4 defines a front row of slots 40 and a rear row of slots 41, both of which are arranged in a longitudinal direction and extending vertically. Further, the rear row of slots 41 is defined on a higher plane while the front row of slots 40 is defined on a lower plane. In assembly, the vertical portions 52 of the upper row of terminals 5 are retained and secured in the rear row of slots 41, further extending through said rear slots 41 and downwards to be able to connect to the PCB. In the same way, the vertical portions 52 of the lower row of terminals 5 are retained and secured in the front row of slots 40, further extending through said front slots 40 and downwards to be able to connect to the PCB. Therefore, the vertical portions 52 of the terminals 5 are firmly secured in the locator 4 and protected from undesired deformation when mounting the electrical card connector 1 to the PCB.

The spacer 6 has a pair of end walls 60 retained in a pair of recesses 36, which is defined in the inner surfaces of the guiding arms 30 of the insulating body 3. The spacer 6 defines a plurality of through holes 61 from a front wall to a rear wall thereof. The through holes 61 are arranged in two rows and each row is arranged along a longitudinal direction of the spacer 6. The extended portions 51 of the terminals 5 are extending through the through holes 61 of the spacer 6, thereby the extended portions 51 are secured in the spacer 6 and protected from undesired broken when mounting the electrical card connector 1 to the PCB.

Referring to FIG. 2, the shielding shell 7 and the shielding blade 8 are respectively covering on the front receiving section 33 and the rear receiving section 32 of the insulating body 3. In assembly, the shielding shell 7 is assembled to the insulating body 3 by two bolts (not shown) respectively through a pair of mounting apertures 70 defined at the back of the shielding shell 7 and a pair of second mounting holes 37 defined at two opposite ends of the transverse wall 31. In the same way, the shielding blade 8 is assembled to the insulating body 3 by two bolts (not shown) respectively through a pair of mounting opening 80 defined in the front of the shielding blade 8 and the pair of second mounting holes 37 of the insulating body 3. The shielding shell 7 has a pair of side walls 72 extending downwardly from a main body thereof and each side wall 72 defines a cutout 73. The shielding blade 8 also has a pair of side walls 82 extending downwardly from a main body thereof and each side wall 82 also defines three cutouts 83. These cutouts 73, 83 match projections 39 provided on outer surfaces of the guiding arms 30 of the insulating body 3, thereby the shielding shell 7 and the shielding blade 8 are further secured on the insulating body 3. Otherwise, the electrical card connector 1 is secured on the bracket 2 by a bolt (not shown) through an aperture 71 defined in the shielding shell 7 and a mounting post 21 provided on the bracket 2.

The card release mechanism 9 is assembled on the shielding shell 7 and has a button 90 proximate the front edge 22 of the bracket 2. The length from the button 90 to the locator 4 is longer than that from the front edge 22 to the rear edge 23 of the bracket 2.

Accordingly, when the electrical card connector 1 is mounted to the bracket 2, the opening 75 of the receiving room 74 for the electronic card being inserted and the button 90 of the card release mechanism 9 are close to the front edge 22 of the bracket 2, and the extended portions 51 of terminals 5 are extending towards and beyond the rear edge 23 of the bracket 2 to be soldered on the PCB. The spacer 6 and the locator 4 are respectively adapted for securing the extended portions 51 and the vertical portions 52 of the terminals 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector stacking on a bracket for receiving a hard disk drive comprising:
    an insulating body having a transverse wall mounted on a rear portion of the bracket;
    a shielding shell mounted on the bracket and connecting with the insulating body in a front-to-rear direction for covering on the insulating body, the shielding shell and the insulating body combining to define a receiving room for receiving an electronic card, the receiving room providing an opening close to a front edge of the bracket; and
    a plurality of terminals retained in the insulating body and each terminal having a securing portion secured in the transverse wall of the insulating body, an engaging portion extending ahead from the transverse wall and into the receiving room for electrically connecting with the electronic card, and an extended portion extending backwardly from the transverse wall and towards and further beyond the rear edge of the bracket; wherein
    the transverse wall of the insulating body keeps a distance off the rear edge of the bracket;
    the bracket being formed as a bottom plate of the receiving room and being longer than the receiving room formed by the shielding shell and the insulating body in a front-to-rear direction; the insulating body is mounted beyond the rear edge of the bracket.

2. The electrical card connector as described in claim 1, further having a longer length than the bracket and a shorter width than the bracket.

3. The electrical card connector as described in claim 1, further comprising a spacer receiving and securing the extended portions of the terminals.

4. The electrical card connector as described in claim 3, wherein the spacer defines a plurality of holes arranged in a longitudinal direction thereof for the extended portions of the portions extending through.

5. The electrical card connector as described in claim 3, wherein the spacer is assembled between a pair of guiding arms of the insulating body.

6. The electrical card connector as described in claim 5, wherein the spacer has two longitudinal ends respectively secured in two recesses defined in the guiding arms of the insulating body.

7. The electrical card connector as described in claim 1, wherein the terminal has a vertical portion extending downwardly from the extended portion thereof.

8. The electrical card connector as described in claim 7, further comprising a locator receiving and securing the vertical portions of the terminals.

9. The electrical card connector as described in claim 8, wherein the locator defines a plurality of slots extending vertically.

10. The electrical card connector as described in claim 9, wherein the slots are arranged in two rows, and one row of slots is defined on a higher plane while the other row is defined on a lower plane.

11. The electrical card connector as described in claim 8, wherein the locator is assembled between a pair of guiding arms of the insulating body.

12. The electrical card connector as described in claim 11, wherein the locator has a pair of end walls abutting against inner surfaces of the guiding arms of the insulating body.

13. The electrical card connector as described in claim 1, further comprising a shielding blade covering on the extended portions of the terminals.

14. The electrical card connector as described in claim 1, further comprising a card release mechanism assembled on the shielding shell and the card release mechanism having a button proximate the front edge of the bracket.

15. An electrical card connector assembly comprising:
   a bracket for receiving a hard disk drive; and
   an electrical card connector stacking on the bracket comprising:
   an insulating body having a transverse wall
   mounted on a rear portion of the bracket;
   a shielding shell mounted on the bracket and connecting with the insulating body in a front-to-rear direction for covering on the insulating body, the shielding shell and the insulating body combining to define a receiving room for receiving an electronic card, the receiving room providing an opening close to the front edge of the bracket; and
   a plurality of terminals retained in the insulating body and each terminal having a securing portion secured in the transverse wall of the insulating body, an engaging portion extending ahead from the transverse wall and into the receiving room for electrically connecting with the electronic card, and an extended portion extending backwardly from the transverse wall and towards and further beyond a rear edge of the bracket; wherein
   the transverse wall of the insulating body keeps a distance off the rear edge of the bracket;
   the bracket being formed as a bottom plate of the receiving room and being longer than the receiving room formed by the shielding shell and the insulating body in a front-to-rear direction; the insulating body is mounted beyond the rear edge of the bracket.

16. An electrical card connector stacking on a bracket for receiving a hard disk drive comprising:
   an insulating body having a transverse wall far from a front edge of the bracket and relatively adjacent to a rear edge of the bracket;
   a shielding shell covering on the insulating body, the shielding shell and the insulating body combining to define a receiving room for receiving an electronic card, the receiving room providing an opening close to the front edge of the bracket; and
   a plurality of terminals retained in the insulating body and each terminal having a securing portion secured in the transverse wall of the insulating body, an engaging portion extending ahead from the transverse wall and into the receiving room for electrically connecting with the electronic card, and an extended portion extending backwardly from the transverse wall and towards and further beyond the rear edge of the bracket; wherein
   the transverse wall of the insulating body keeps a distance off the rear edge of the bracket;
   wherein the terminal has a vertical portion extending downwardly from the extended portion thereof, further comprising a locator receiving and securing the vertical portions of the terminals; wherein the locator is assembled between the pair of guiding arms of the insulating body; wherein the locator has a pair of end walls abutting against inner surfaces of the guiding arms of the insulating body.

* * * * *